form

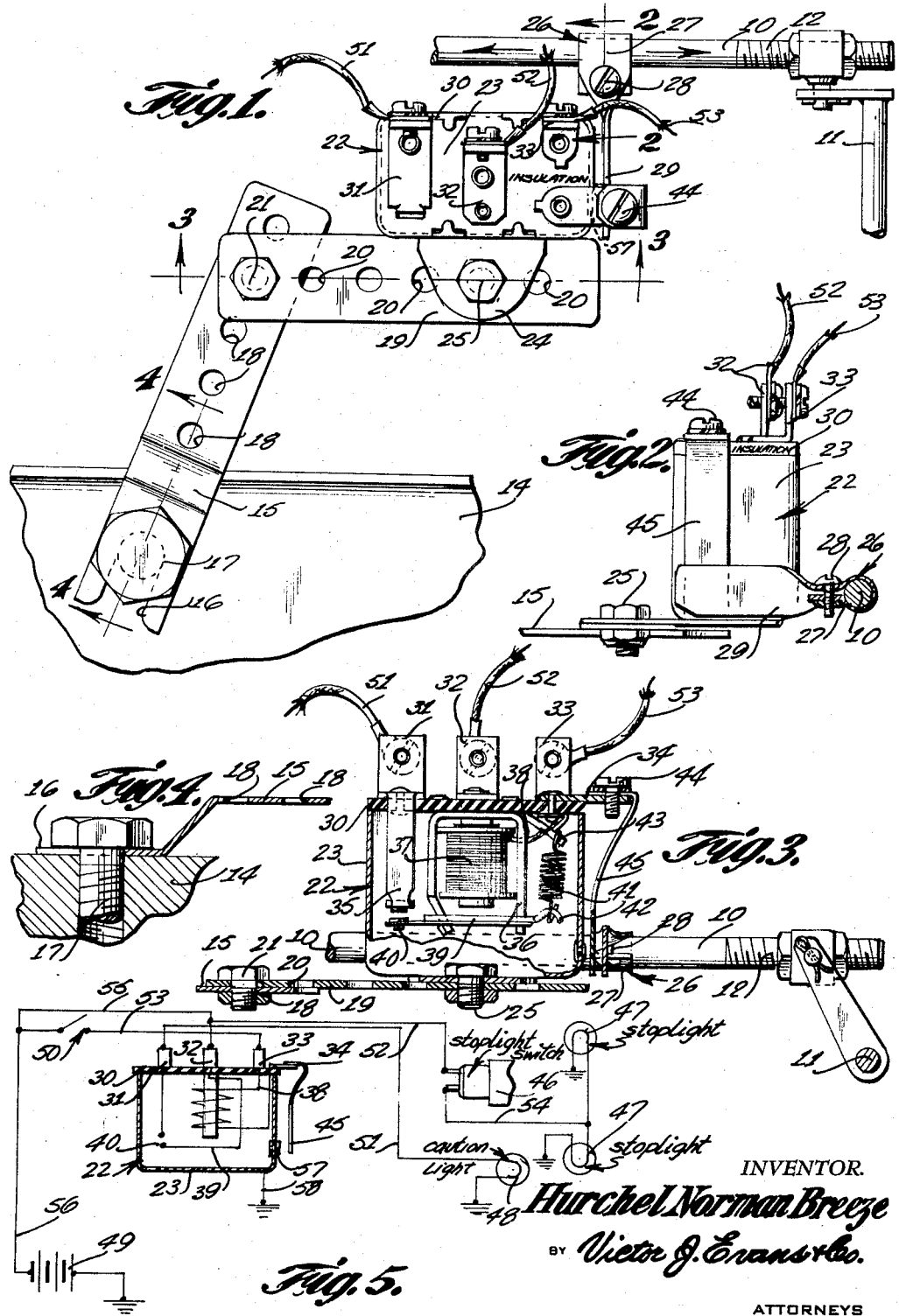

United States Patent Office 2,853,572
Patented Sept. 23, 1958

2,853,572

VEHICLE SIGNAL

Hurchel Norman Breeze, Wellston, Ohio

Application June 3, 1955, Serial No. 513,066

4 Claims. (Cl. 200—61.89)

This invention relates to a vehicle signal, and more particularly to a signal which is illuminated when a vehicle slows down or stops.

The object of the invention is to provide a vehicle signal which is adapted to be actuated by a vehicle accelerator pedal when foot pressure on the accelerator pedal is released, the signal including a warning light which may be arranged at the rear of the vehicle so that persons outside of the vehicle will be warned that the vehicle is slowing down or stopping.

Another object of the invention is to provide a vehicle caution signal which is constructed so that a caution light arranged at the rear of the vehicle is energized or actuated when foot pressure on the accelerator pedal is released so that as soon as a vehicle starts to slow down or stop, persons in vehicles at the rear will be warned so that collisions or accidents can be avoided.

A further object of the invention is to provide a vehicle signal which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the vehicle signal of the present invention, and with parts broken away and in section.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a view illustrating the wiring diagram.

Referring in detail to the drawings, the numeral 10 designates an accelerator rod which includes a threaded portion 12, and linkage 11 is connected to the threaded portion 12 of the rod 10, and the linkage 11 is adapted to be connected to the usual accelerator pedal of the automobile, truck, or other vehicle. The opposite end of the rod 10 from the threaded portion 12 is adapted to be connected to the vehicle carburetor. The numeral 14 designates a portion of the vehicle body or engine block, and a bar 15 is provided with a slot 16 through which extends a securing element 17. The bar 15 is provided with a plurality of openings 18, and an arm 19 also has openings 20 which have a securing element such as a bolt and nut assembly 21 extending therethrough. Thus, by means of the bolt 21, the arm 19 and bar 15 can be connected together, and the plurality of openings 18 and 20 permit these parts to be arranged at different adjusted positions.

There is further provided a switch which is indicated generally by the numeral 22, and the switch 22 includes a metal housing or casing 23. Extending from the housing 23 and secured thereto or formed integral therewith is a flange 24. A bolt 25 extends through the flange 24 and through one of the openings 20 in the arm 19 for connecting the switch to the arm 19.

Mounted on the movable rod 10 is a bracket 26 which includes a curved portion 27 that defines a clamp which is mounted on the rod 10 through the medium of a bolt 28. The bracket 26 further includes a projecting finger 29 for a purpose to be later described.

Mounted on the housing 23 is an insulated cover or plate 30. Secured to the insulated cover 30 are four terminals 31, 32, 33, and 34. The first terminal 31 includes an inner L-shaped portion 35 that is arranged within the housing 23. A U-shaped metal yoke 36 is positioned within the housing 23, and the yoke 36 is electrically connected to the second terminal 32. A coil 37 is mounted within the yoke 36, and a wire 38 connects the coil 37 to the fourth terminal 34.

A contact member 39 is pivotally or movably connected to the yoke 36, and the contact member 39 carries a contact piece 40 which is mounted for movement into and out of engagement with the portion 35, as the coil 37 is energized.

A means is provided for normally urging the contact piece 40 out of engagement with the portion 35, and this means comprises a coil spring 41 which has one end connected to a tongue 42 on the contact 39, while the other end of the coil spring 41 is connected to a tongue 43 which may be formed integral with the yoke 36. The bolt 44 connects a spring lug 45 to the fourth terminal 34, and the lug 45 is adapted to be engaged by the finger 29 as the rod 10 is shifted by the accelerator pedal.

The numeral 46 designates the usual stop light switch which is adapted to be actuated by the foot brake in the vehicle, and the numeral 47 designates the stop lights which are energized by the switch 46. There is further provided a caution light 48 which may also be arranged at the rear of the vehicle, and the numeral 49 designates the vehicle battery, while the numeral 50 designates the ignition switch. A wire 51 leads from the light 48 to the terminal 31, and a wire 52 leads from the terminal 32 to the switch 46. The third terminal 33 may be connected to the ignition switch 50 by means of a wire 53, and the switch 46 may be connected to the stop lights 47 by means of a wire 54, there being a wire 55 connecting the wire 52 to the wire 56 which leads to the battery 49. A contact member 57 is arranged on the metal housing 23, and the contact member 57 is adapted to be engaged by the lower end of the spring lug 45 as the lug 45 is urged inwardly by means of the finger 29 on the bracket 26. The housing 23 may be grounded as at 58. By closing the contacts 57 and 45, the coil 37, when energized, will pull the contact member 39 towards the coil 37, when the switch 50 is closed.

From the foregoing, it is apparent that there has been provided a vehicle signal which is constructed so that when foot pressure is released on the accelerator pedal, the rod 10 will shift whereby as soon as pressure is released on the accelerator pedal, the caution light 48 will be illuminated to thereby give warning to persons in vehicles behind that the car is slowing down so that there will be no collisions or accidents. The lug 45 is mounted for movement into and out of engagement with the contact 57, and the spring 41 has a tendency to normally urge the contact 40 away from the contact 35. The coil 37 serves to selectively attract the member 39 so that the contact 40 can be moved into and out of engagement with the contact 35. Furthermore, the wiring is such that there will be no interference with the normal stop lights 47 which are actuated when the brake switch 46 is energized by means of the foot brake. Due to the provision of the plurality of openings 18 and 20, the bar 15 and arm 19 can be arranged at different angular or adjusted positions. When the stop lights 47 are on, the signal light 48 is off and the electrical circuit is completed at times through the metal housing 23. The ignition switch 50 must be on before the signal light 48 will work.

The present invention can be readily installed in a vehicle without materially altering the construction of the various parts and the signal light 48 will not be confusing to the general public. The bracket 26 is clamped to the rod 10 by means of the bolt 28. When the accelerator rod 10 is in retarded position, the finger 29 will engage the lug 45 to move the lug 45 into engagement with the contact 57 to thereby complete the circuit through the housing 23. The terminal 34 is connected to the negative ground side of the coil 37 through the medium of the wire 38 so that when pressure is released on the accelerator pedal the circuit will be completed. The bolt 25 may serve as a pivot pin to permit adjustment of the switch to different angular positions. The wire 51 leads from the light 48 to the terminal 31. The wire 53 leads from the terminal 33 to the ignition switch 50. Furthermore, the signal 48 will be actuated or energized whenever the ignition switch 50 is on and when the vehicle is not in motion and when the foot brake switch 46 is not actuated by pressure on the foot brake. The bracket 26 may be clamped at different positions on the rod 10, and where applicable, the linkage 11 may be omitted. The coil 37 attracts member 39 only when the switch 50 is closed and when the contacts 57 and 45 are closed.

I claim:

1. A switch, an actuator for said switch, a bracket mounted on said actuator and including a projecting finger, a bar extending from a support and secured thereto, an arm extending from said bar and connected thereto, a metal housing including a flange connected to said arm, an insulated cover mounted on said housing, a first, second, third and fourth terminal mounted on said cover, said first terminal including an L-shaped portion arranged within said housing, a U-shaped metallic yoke arranged within said housing and connected to said second terminal, a coil poistioned within said yoke and electrically connected to said second terminal, a contact pivotally connected to said yoke and mounted for movement into and out of engagement with the L-shaped portion of said first terminal upon actuation of said coil, resilient means for normally urging said contact away from said L-shaped portion, a spring lug adapted to be engaged by said finger and connected to said fourth terminal and mounted for movement into and out of engagement with said housing, and a wire connecting said fourth terminal to said coil.

2. The structure as defined in claim 1, wherein said bar and arm are each provided with a plurality of apertures for the projection therethrough of a securing element.

3. The structure as defined in claim 1, wherein said resilient means comprises a coil spring.

4. A switch, an actuator for said switch, a bracket mounted on said actuator and including a projecting finger, a bar extending from a support and secured thereto, an arm extending from said bar and connected thereto, a housing including a flange connected to said arm, an insulated cover mounted on said housing, a first, second, third and fourth terminal mounted on said cover, said first terminal including an L-shaped portion arranged within said housing, a yoke arranged within said housing and connected to said second terminal, a coil positioned within said yoke and electrically connected to said second terminal, a contact pivotally connected to said yoke and mounted for movement into and out of engagement with the L-shaped portion of said first terminal upon actuation of said coil, a coil spring for normally urging said contact away from said L-shaped portion, a spring lug adapted to be engaged by said finger and connected to said fourth terminal and mounted for movement into and out of engagement with said housing, a conductor connecting said fourth terminal to said coil, said bar and arm being provided with apertures for the projection therethrough of a securing element.

References Cited in the file of this patent

UNITED STATES PATENTS

| | | |
|---|---|---|
| 1,156,453 | Banes | Oct. 12, 1915 |
| 2,301,583 | Rodrick | Nov. 10, 1942 |
| 2,589,410 | Leete | Mar. 18, 1952 |
| 2,650,963 | Graveno | Sept. 1, 1953 |